US008910082B2

(12) United States Patent
Aarabi

(10) Patent No.: US 8,910,082 B2
(45) Date of Patent: Dec. 9, 2014

(54) METHOD AND SYSTEM FOR MODIFICATION OF DIGITAL IMAGES THROUGH ROTATIONAL CASCADING-EFFECT INTERFACE

(71) Applicant: Parham Aarabi, Toronto (CA)

(72) Inventor: Parham Aarabi, Toronto (CA)

(73) Assignee: Modiface Inc., Toronto (CA)

( * ) Notice: Subject to any disclaimer, the term of this patent is extended or adjusted under 35 U.S.C. 154(b) by 181 days.

(21) Appl. No.: 13/713,059

(22) Filed: Dec. 13, 2012

(65) Prior Publication Data

US 2014/0047389 A1     Feb. 13, 2014

Related U.S. Application Data

(60) Provisional application No. 61/682,101, filed on Aug. 10, 2012.

(51) Int. Cl.
*G06F 3/048*     (2013.01)
*G06F 3/0482*    (2013.01)
*G06F 3/0481*    (2013.01)

(52) U.S. Cl.
CPC .......... *G06F 3/0482* (2013.01); *G06F 3/04817* (2013.01)
USPC ...................................................... 715/834

(58) Field of Classification Search
CPC ........................... G06F 3/0482; G06F 3/04817
USPC ......................................................... 715/834
See application file for complete search history.

(56) References Cited

U.S. PATENT DOCUMENTS

| 7,509,348 B2* | 3/2009 | Burtner et al. ........................ 1/1 |
| 7,898,529 B2* | 3/2011 | Fitzmaurice et al. ......... 345/173 |
| 2007/0052726 A1* | 3/2007 | Wright et al. ................. 345/629 |
| 2007/0271528 A1* | 11/2007 | Park et al. ..................... 715/810 |
| 2008/0250349 A1* | 10/2008 | Peiro et al. .................... 715/810 |
| 2009/0231356 A1* | 9/2009 | Barnes et al. ................. 345/594 |
| 2009/0327955 A1* | 12/2009 | Mouilleseaux et al. ...... 715/810 |
| 2010/0192102 A1* | 7/2010 | Chmielewski et al. ....... 715/834 |
| 2010/0306702 A1* | 12/2010 | Warner ......................... 715/811 |
| 2011/0202838 A1* | 8/2011 | Han et al. ...................... 715/702 |
| 2012/0306788 A1* | 12/2012 | Chen et al. .................... 345/173 |
| 2013/0019175 A1* | 1/2013 | Kotler et al. .................. 715/728 |

\* cited by examiner

*Primary Examiner* — Omar Abdul-Ali
(74) *Attorney, Agent, or Firm* — Gowling Lafleur Henderson LLP

(57) ABSTRACT

Provided is a method and system of modifying a digital image rendered on a display screen. The method comprises showing, at the display screen, a category menu shaped as a portion of an annular ring and including a plurality of category options, ones of the plurality of category options being cascadable onto the display screen via a rotational input action received at the processor of the computing device; receiving a first input selecting one of the plurality of category options; displaying, in the portion of the annular ring, a subcategory menu having a plurality of subcategory options associated with the selected category option, ones of the plurality of subcategory options being cascadable onto the display screen via the rotational input action, receiving a second input selecting one of the subcategory options, displaying, in an arched arrangement on the display screen, a plurality of product effect options associated with the selected subcategory option; receiving a third input selecting one of the product effect options; and automatically modifying the digital image by simulating application thereon of a visual effect associated with the selected product effect option.

18 Claims, 9 Drawing Sheets

Different product elements available on the element arch

Digital image modified based on the element selected by the user

METHOD AND SYSTEM FOR MODIFICATION OF DIGITAL IMAGES THROUGH ROTATIONAL CASCADING-EFFECT INTERFACE

This Application claims priority to U.S. Provisional Patent Application No. 61/682,101 filed Aug. 10, 2012, and incorporates by reference the disclosure of said Application No. 61/682,101 in the entirety.

FIELD

The present disclosure relates generally to a system and method for modifying digital images using a cascading-effect interface.

BACKGROUND

Digitally-based detection of a person's features based on an accessed digital photograph is finding its way into a variety of internet applications as well as modifications of the digital photograph using various visual effects.

Trying on and buying beauty products can be a significant chore when it involves travelling to a store or boutique, as travelling to, then taking the time to try a certain number of products in the store or boutique can result in a significant inconvenience to shoppers. A streamlined process allowing shoppers/customers to save time by showing myriad visual renderings, via simulations of those visual effects regarding myriad beauty products may advantageously provide time-saving benefits to the on-line internet shopper, enabling them to "try on", in a virtual context via simulation, any beauty article or product using a personal digital photograph, prior to making a purchase.

Yet further, given the prevalence of wireless mobile computing devices, significant time benefits may be realized by a user being able to effect such simulations on the mobile device. The relatively small display screen of such devices, however, may adversely limit the usability of those devices for such purposes, given existing user interface approaches.

SUMMARY OF THE INVENTION

Provided is a method, executed in a computing device having a display screen and a processor, of modifying a digital image rendered on the display screen. The method comprises showing, at the display screen, a category menu shaped as a portion of an annular ring and including a plurality of category options, ones of the plurality of category options being cascadable onto the display screen via a rotational input action received at the processor of the computing device; receiving a first input selecting one of the plurality of category options; displaying, in the portion of the annular ring, a subcategory menu having a plurality of subcategory options associated with the selected category option, ones of the plurality of subcategory options being cascadable onto the display screen via the rotational input action; receiving a second input selecting one of the subcategory options; displaying, in an arched arrangement on the display screen, a plurality of product effect options associated with the selected subcategory option; receiving a third input selecting one of the product effect options; and automatically modifying the digital image by simulating application thereon of a visual effect associated with the selected product effect option.

In an embodiment the rotational input action is received via a thumbwheel input device.

In a variant embodiment, the computing device may be a wireless mobile smartphone, and the thumbwheel input device may be located proximate a bottom corner of the wireless mobile smartphone.

In another embodiment, the rotational input action is received via a touchscreen input action received at the display screen.

The category options consist of at least one of an eye, a lip, a face, hair and a fingernail, in an embodiment.

The product effect options comprise colors associated with a cosmetics product, in another variant embodiment.

In a further embodiment, the colors are arranged in increasing shades of intensity.

The product effect options, in yet another embodiment, comprise a series of patterns each corresponding to a nail salon treatment effect.

In yet another embodiment, the product effect options comprise a series of textures.

The computing device is one of a mobile wireless smartphone, a kiosk, a portable computer, and a desktop computer, in an embodiment, The computing device is communicatively coupled to a cosmetics products database, in a further embodiment.

Yet further, the arched arrangement of product effect options is displayed in lieu of the category and subcategory menus upon receiving the second input.

In yet another variant embodiment, the method further comprises displaying a back button generally centered within the portion of the annular ring, and receiving a selection of the back button to display at least one of the subcategory menu and the category menu in lieu of the arched arrangement of product effect, options.

The third input comprises a touchscreen input provided at the display screen, in one embodiment.

In alternative embodiment, the third input comprises a click to select input received at the computing device.

The digital image is one of a facial image and a hand image of a pre-identified user, in an embodiment.

In yet another embodiment, the annular ring portion including the category options is switchably located proximate a left side and a right side of the display screen.

BRIEF DESCRIPTION OF THE DRAWINGS

Embodiments will now be described by way of example only, with reference to the following drawings in which.

DETAILED DESCRIPTION

Figure 1:
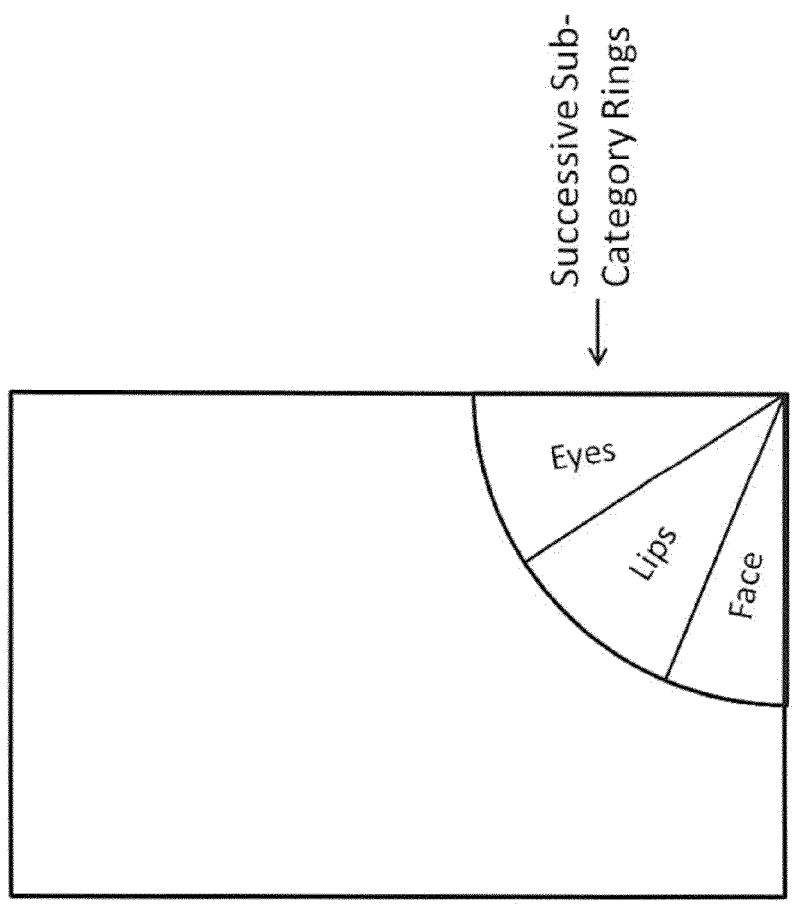
FIG. 1 shows in one embodiment, a category menu ring having cosmetics makeup category menu options for applying the image modification.

This disclosure outlines a system consisting of a mobile, tablet, or other computer system with a touch or mouse input, where a user rotationally navigates through a set of cascaded radial menus to narrow down upon a final selection for modifying a digital image rendered on the computer system.

The system consists of a mobile, tablet, or other computer system with a touch or mouse input, where the described user interface is going to be implemented on.

The input from the user is delivered to the system based on the finger-touch hardware. The system will then process the user's input in order to proceed with the rest of the procedure and make further decisions as will be described.

The user starts by choosing a photo to modify. This photo could come from any available source, including (but not limited to) the local photo library on the mobile device, the camera available on the device, a remote server, etc.

After selecting the digital image to modify, the image will be processed and analyzed by the system and then a variety of image modification effects will be provided to the user to select from, where each of these effects is associated with a certain type of product in the real-world.

In one embodiment, the image is an image of a face, where all facial features, for example, eyes, lips, nose, eyebrows, etc. are visible, and the image also contains a large enough region around the persons face (so a fair amount of the person's hair is also seen in the image). The products are also beauty products that could be applied to the face, such as eye products (eyeliner, eye shadow, etc.), lip products (lipstick, lip gloss, etc.) and skin products (foundation, etc.).

In one embodiment, the user interface for the virtual makeover mobile application has many unique elements. This application was specially designed to make the user interaction as seamless as possible making the most ideal makeover experience.

Thumb Wheel

This thumb wheel may be the main category selection menu. It may be positioned in the bottom corner of the screen. A mobile device is held in someone's hand which enforces their thumbs to be the drivers of the screen. Strategically placing the menu thumb wheel—which is the portion of the application most interacted with—close to the bottom corner makes the use of the app significantly easier than having it placed anywhere else on the screen. This wheel is switched from the right side to the left side based on user information if they are right-handed or left-handed, In one embodiment, the categories available on the thumb wheel are the main beauty and makeup categories, such as eyes, lips, face, etc. Once the user selects any of these main categories, the system will proceed to subcategories using the cascading category rings, where the user can narrow down the choice of the beauty products.

Cascading Category Rings

The category thumb wheel has successive rings that open to display sub-category menus for users to further interact with the application. These rings have a cascading effect so the recent-most opened menu is displayed at the outer layer of the rings with the largest radius, and the previous menus are absorbed in the inner ring layers with smaller radius. Thus, the user will always have the option to go backwards and change previously made selections.

FIG. 1 shows in one embodiment, a category menu ring having cosmetics makeup category menu options for applying the image modification.

Each ring is representative of all possible options available for a certain category of image modification effects. So the user can scroll through a certain category of image modification effects at once by simply swiping the corresponding ring.

Once the user selects a category, he will be directed to the next sub-category, and the same scrolling and choosing process will keep going, until the required image modification effect has exactly been selected among all different types and categories of effects.

Figure 2:
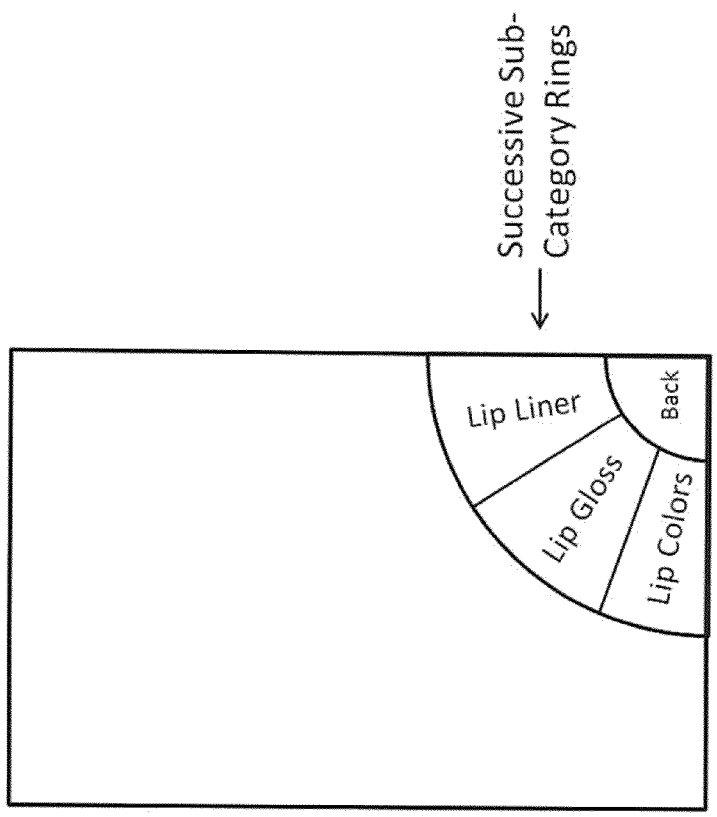
FIG. 2 shows in one embodiment, successive sub-category menu ring having options corresponding to different lip-related beauty products where previously presented categories are merged into a back button.

FIG. 2 shows in one embodiment, successive sub-category menu ring having options corresponding to different lip-related beauty products where previously presented categories are merged into a back button.

Product Element Arch

Figure 3:
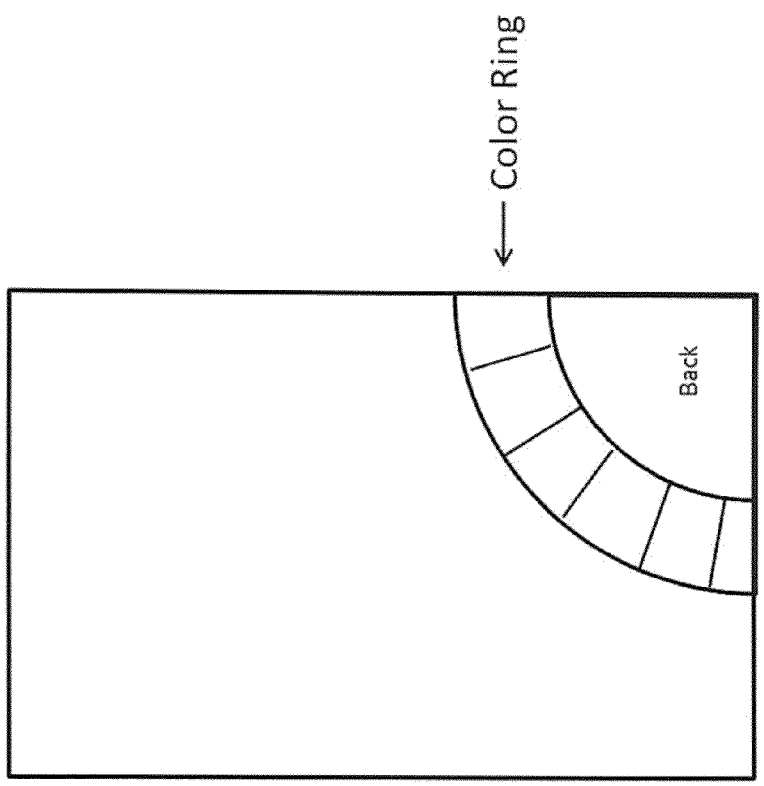
FIG. 3 shows in one embodiment, presenting the possible color options for a certain image modification effect where previously presented categories are merged into a back button.

FIG. 3 shows in one embodiment, presenting the possible color options for a certain image modification effect where previously presented categories are merged into a back button.

Figure 4:
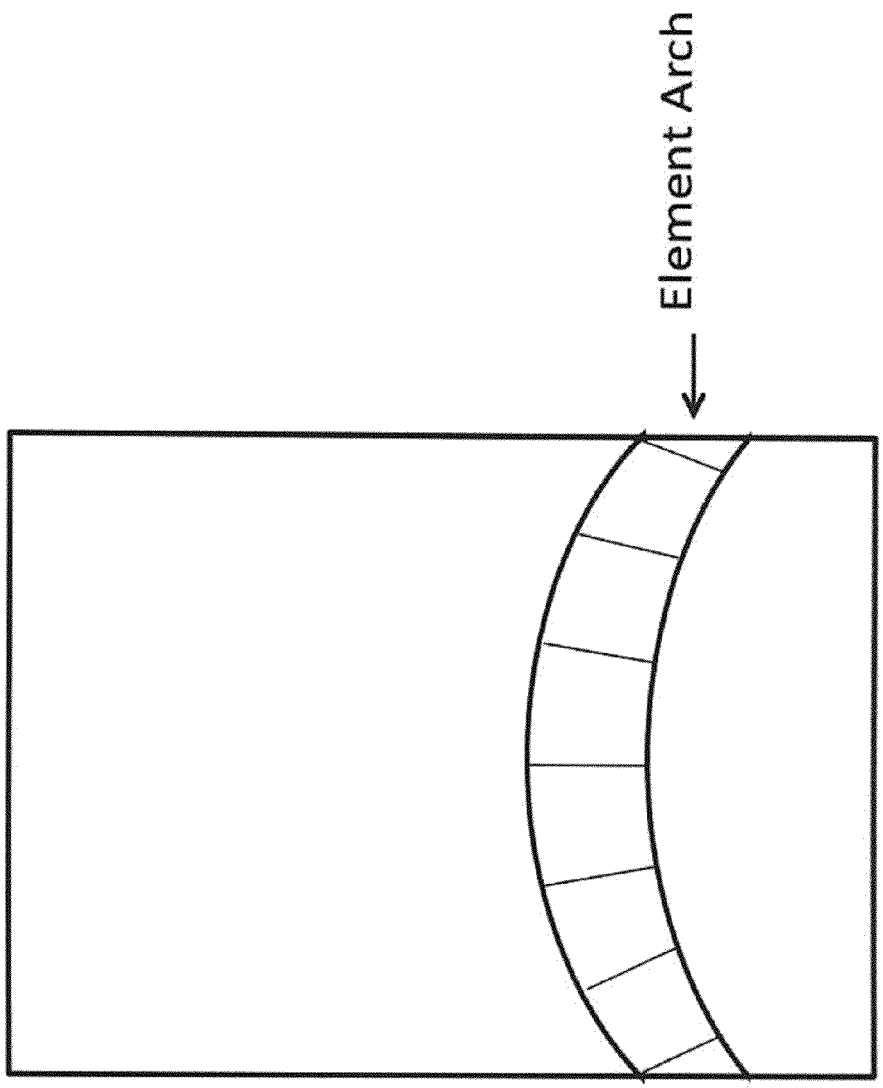
FIG. 4 shows use of the product effect options arch to present all possible element options for a selected image modification effect to the user, where the arch can be scrolled in order to search the options.

FIG. 4 shows use of the product effect options arch to present all possible element options for a selected image modification effect to the user, where the arch can be scrolled in order to search the options.

The product arch can easily be scrolled through using your thumb to search for the desired color to be applied. The product selection is also an additional category wheel in the cascading menu, for certain devices. This allows for optimum use for the user. In a sweep of their thumb a user can select a category (i.e. Lips) then select a sub category (i.e. lip gloss) then scroll through a variety of shade, select their preferred color and have it automatically applied to their image. This is the most seamless interface that makes the makeover experience quick and painless.

Figure 5:
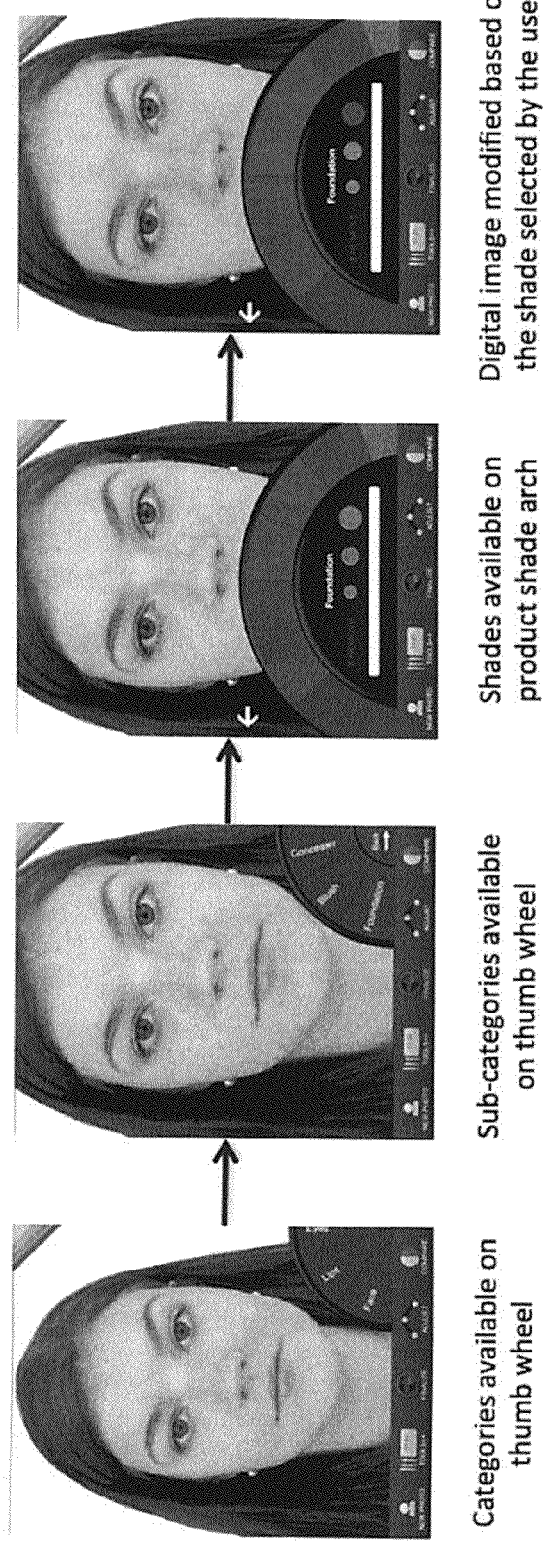
FIG. 5 shows in one embodiment, the rotational cascaded menu used to select the face modification category, then selecting the foundation sub-category, and finally choosing the desired foundation color using the product effect options arch, to apply the image modification effect.
Figure 6:
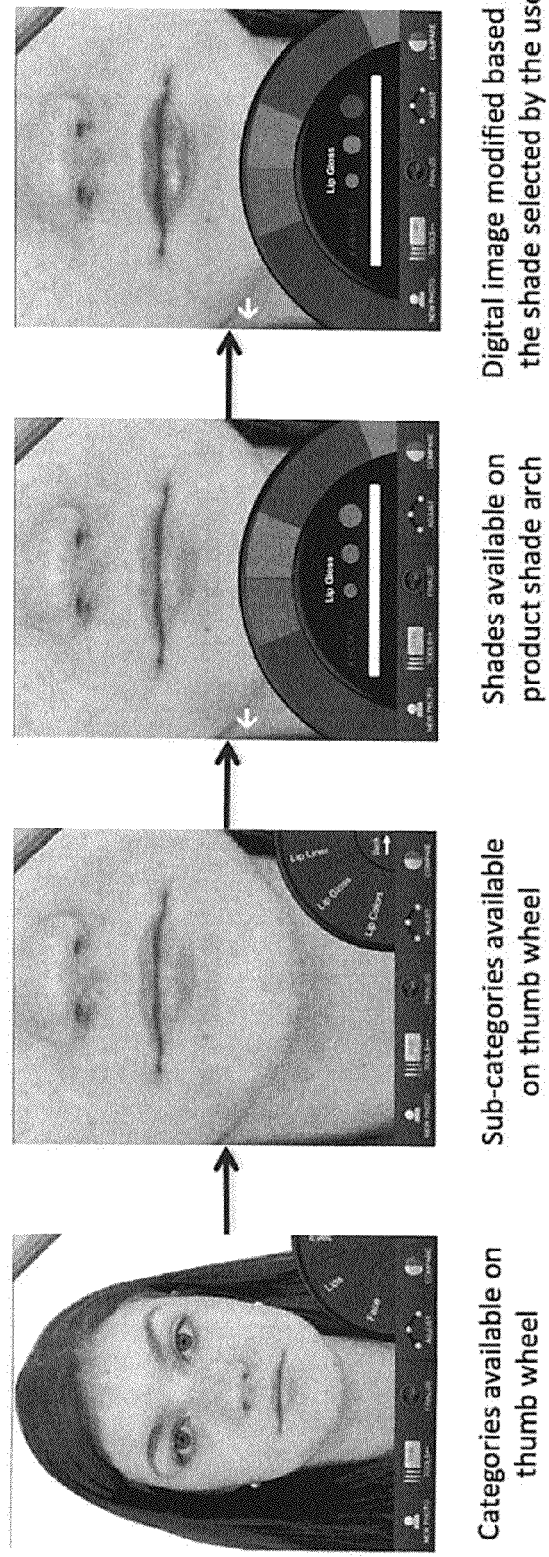
FIG. 6 shows in one embodiment, use of the rotational cascading menu to select the lips modification category, then select the lip gloss sub-category using the thumb wheel, and finally chose the desired gloss color using the product effect options arch, to apply the image modification.

An example of the rotational cascaded menu workflow is shown in FIGS. 5-6. In this embodiment, the image modification effects are related to the simulation of beauty and makeup products on a digital photo of a person's face. The main categories in this example include modification of different facial features, including (but not limited to) face, lips, and eyes.

FIG. 5 shows in one embodiment, the rotational cascaded menu used to select the face modification category, then selecting the foundation sub-category, and finally choosing the desired foundation color using the product effect options arch, to apply the image modification effect. In FIG. 5, the user has selected the subcategory "Foundation" from the main category "face". Then, the element arch is presented to the user so he/she can scroll through a variety of different color elements, and choose the desired color for foundation. The final image on the right of FIG. 5 displays the modified image based on the user's selection of the modification categories and their details, which is the digital image of the person's face where the foundation color has been modified here.

FIG. 6 shows in one embodiment, use of the rotational cascading menu to select the lips modification category, then select the lip gloss sub-category using the thumb wheel, and finally chose the desired gloss color using the product effect options arch, to apply the image modification. In FIG. 6, the user has selected the subcategory "lip gloss" from the main category "lips". Then, the element arch is presented to the user so he/she can scroll through a variety of different color elements, and choose the desired color for the lip gloss. The final image on the right of FIG. 5 displays the modified image based on the user's selection of the modification categories and their details, which is the digital image of the person's lips where the gloss color has been modified here.

Figure 7:
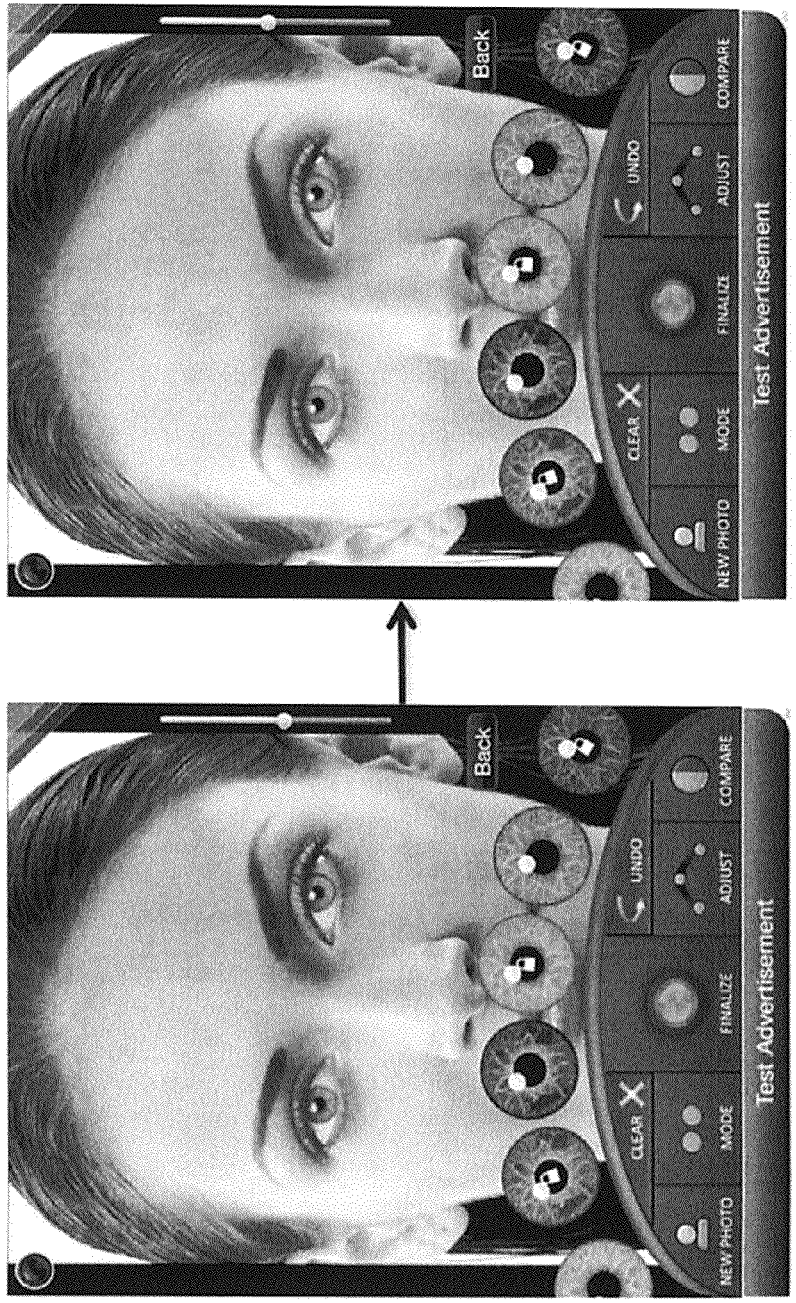
FIG. 7 shows in one embodiment, use of the product options arch to present the options for eye coloring, and applying the desired eye coloring effect based on the user's selection of options presented via the arch.

FIG. 7 shows in one embodiment, use of the product options arch to present the options for eye coloring, and applying the desired eye coloring effect based on the user's selection of options presented via the arch. In the embodiment presented in FIG. 7, the image modification effect is changing the color and texture of a person's eye in a digital image, to a desired eye color and texture, selected by the user. The image on the left in FIG. 7 displays the digital image with the element arch presenting a variety of different eye color and texture effects to the user. The user can scroll through the elements and chose the desired one The image on the right in FIG. 7 displays the modified digital image based on the user's selection of the modification details and elements, i.e. the digital image in which the color and texture of the person's eyes has been transformed to the target eye color and texture selected by the user.

Figure 8:
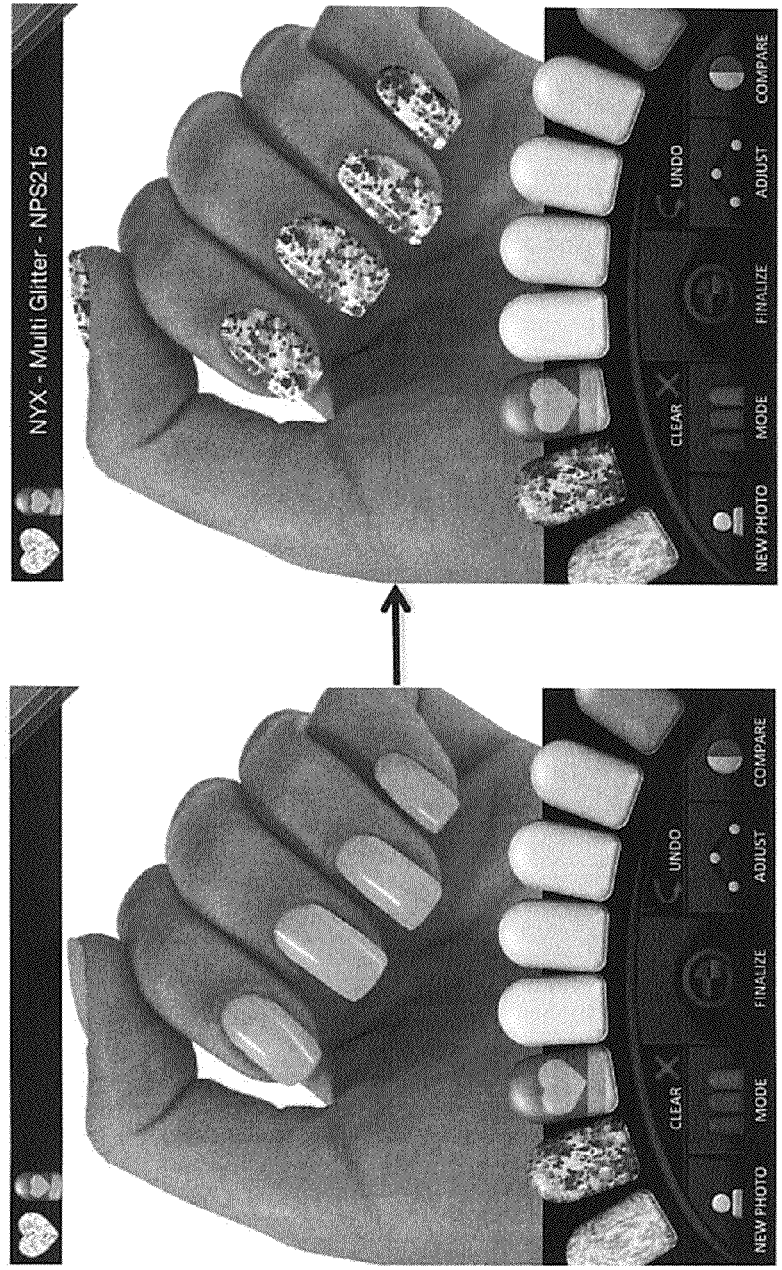
FIG. 8 shows in one embodiment, application of the product options arch to present the options for nail salon coloring, and application of the desired nail salon color effect based on selection of product effect options.

FIG. 8 shows in one embodiment, application of the product options arch to present the options for nail salon coloring, and application of the desired nail salon color effect based on selection of product effect options. In the embodiment presented in FIG. 8, the image modification effect is modifying a digital image of a person's hand, in order to simulate the effect of a nail salon, selected by the user. The image on the left in FIG. 8 displays the digital image with the element arch presenting a variety of different nail salon effects to the user. The user can scroll through the elements and chose the desired one. The image on the right in FIG. 8 displays the modified digital image based on the user's selection of the modification details and elements, i.e. the digital image in which the effect of applying the nail salon chosen by the user has been simulated.

Figure 9:
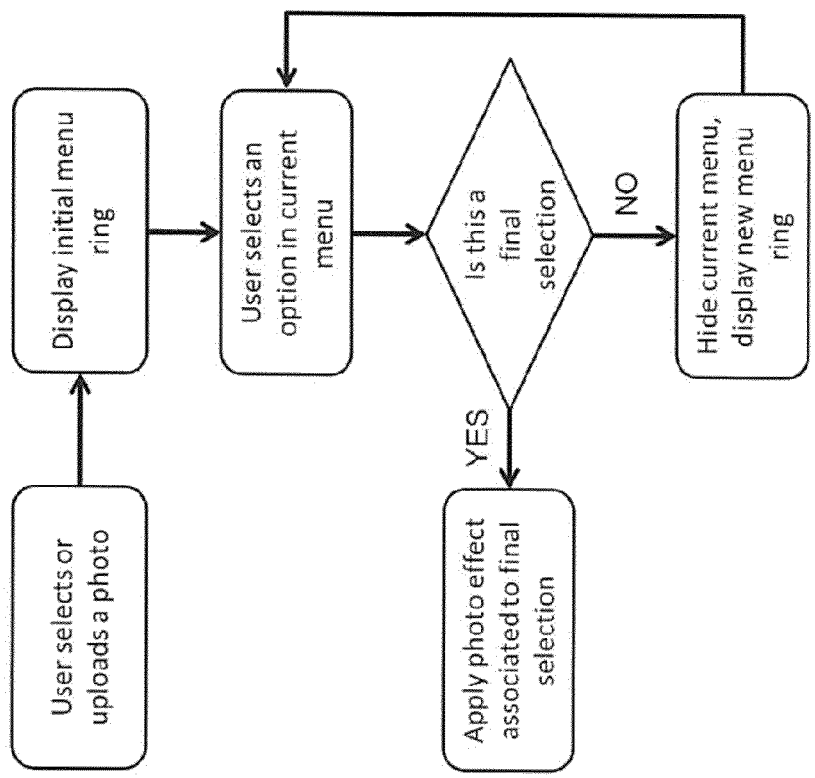
FIG. 9 shows a flowchart of a process, in one embodiment, for modifying a digital image based on rotational cascaded menus.

FIG. 9 shows a flowchart of a process, in one embodiment, for modifying a digital image based on rotational cascaded menus. A digitally rendered initial semicircular menu may be centered at one of the corners of the display which consists of an initial set of options displayed in the menu. Provided is the ability to rotate the menu to reveal additional options, the ability to select one of the options in the menu by touching, clicking, or other means, and one or more additional digitally rendered semicircular menus with increasing radial ring sizes that are only displayed once a selection is made in the initial menu, or once a selection is made in any subsequent menus prior to a current menu. Once a selection is made in the final semicircular menu, to activate a specific photo effect which is applied to the original image. The initial menu ring may consists of a primary cosmetics category, the secondary menu consists of a cosmetics subcategory, and the third and final menu ring consists of color swatches associated with the chosen subcategory. IN an embodiment, only the current menu is shown as a semicircular ring and all previous menus are hidden. Yet further, the hidden previous menus may be accessed by a single back button centered in the semicircular menu touching or clicking which sequentially goes back to the previous menu level.

Although the invention has been described with reference to specific exemplary embodiments in the field of cosmetics products and visually simulated usage thereof, it pertains to other kinds of products amendable to simulated usage based on a digital image.

Thus, varying modifications thereof will be apparent to those skilled in the art without departing from the scope of the invention as defined by the appended claims.

What is claimed is:

1. A method, executed in a computing device having a display screen and a processor, of modifying a digital image rendered on the display screen, the method comprising:
    showing, at the display screen, a category menu shaped as a portion of an annular ring and including a plurality of category options, ones of the plurality of category options being cascadable onto the display screen via a rotational input action received at the processor of the computing device;
    receiving a first input selecting one of the plurality of category options;
    displaying, in the portion of the annular ring, a subcategory menu having a plurality of subcategory options associated with the selected category option, ones of the plurality of subcategory options being cascadable onto the display screen via the rotational input action;
    receiving a second input selecting one of the subcategory options; and
    automatically modifying the digital image by simulating application in a local region of the image of a visual effect associated with the selected subcategory option.

2. The method of claim 1 wherein the rotational input action is received via a thumbwheel input device.

3. The method of claim 2 wherein the computing device is a wireless mobile smartphone, and the thumbwheel input device is located proximate a bottom corner of the wireless mobile smartphone.

4. The method of claim 1 wherein the rotational input action is received via a touchscreen input action received at the display screen.

5. The method of claim 1 wherein the category options consist of at least one of an eye, an eyebrow, a lip, a face, hair and a fingernail.

6. The method of claim 1 wherein the computing device is one of a mobile wireless smartphone, a kiosk, a portable computer, and a desktop computer.

7. The method of claim 1 wherein the computing device is communicatively coupled to a cosmetics products database.

8. The method of claim 1 further comprising:
    displaying a back button generally centered within the portion of the annular ring; and
    receiving a selection of the back button to display the category menu in lieu of the subcategory options.

9. The method of claim 1 wherein the first input or second input comprises a touchscreen input provided at the display screen.

10. The method of claim 1 wherein the first input or second input comprises a click to select input received at the computing device.

11. The method of claim 1 wherein the digital image is one of a facial image and a hand image of a pre-identified user.

12. The method of claim 1 wherein the annular ring portion including the category options is switchably located proximate a left side and a right side of the display screen.

13. A method, executed in a computing device having a display screen and a processor, of modifying a digital image rendered on the display screen, the method comprising:
- showing, at the display screen, a category menu shaped as a portion of an annular ring and including a plurality of category options, ones of the plurality of category options being cascadable onto the display screen via a rotational input action received at the processor of the computing device;
- receiving a first input selecting one of the plurality of category options;
- displaying, in the portion of the annular ring, a subcategory menu having a plurality of subcategory options associated with the selected category option, ones of the plurality of subcategory options being cascadable onto the display screen via the rotational input action;
- receiving a second input selecting one of the subcategory options;
- displaying, in an arched arrangement on the display screen, a plurality of product effect options associated with the selected subcategory option;
- receiving a third input selecting one of the product effect options; and
- automatically modifying the digital image by simulating application thereon of a visual effect associated with the selected product effect option.

14. The method of claim 13 wherein the product effect options comprise colors associated with a cosmetics product.

15. The method of claim 14 wherein the colors are arranged in increasing shades of intensity.

16. The method of claim 13 wherein the product effect options comprise a series of patterns each corresponding to a nail salon treatment effect.

17. The method of claim 13 wherein the product effect options comprise a series of textures.

18. The method of claim 13 wherein the arched arrangement of product effect options is displayed in lieu of the category and subcategory menus upon receiving the second input.

* * * * *